March 23, 1943.    G. T. McCLURE    2,314,413
BRAKE MEANS
Filed Oct. 31, 1941
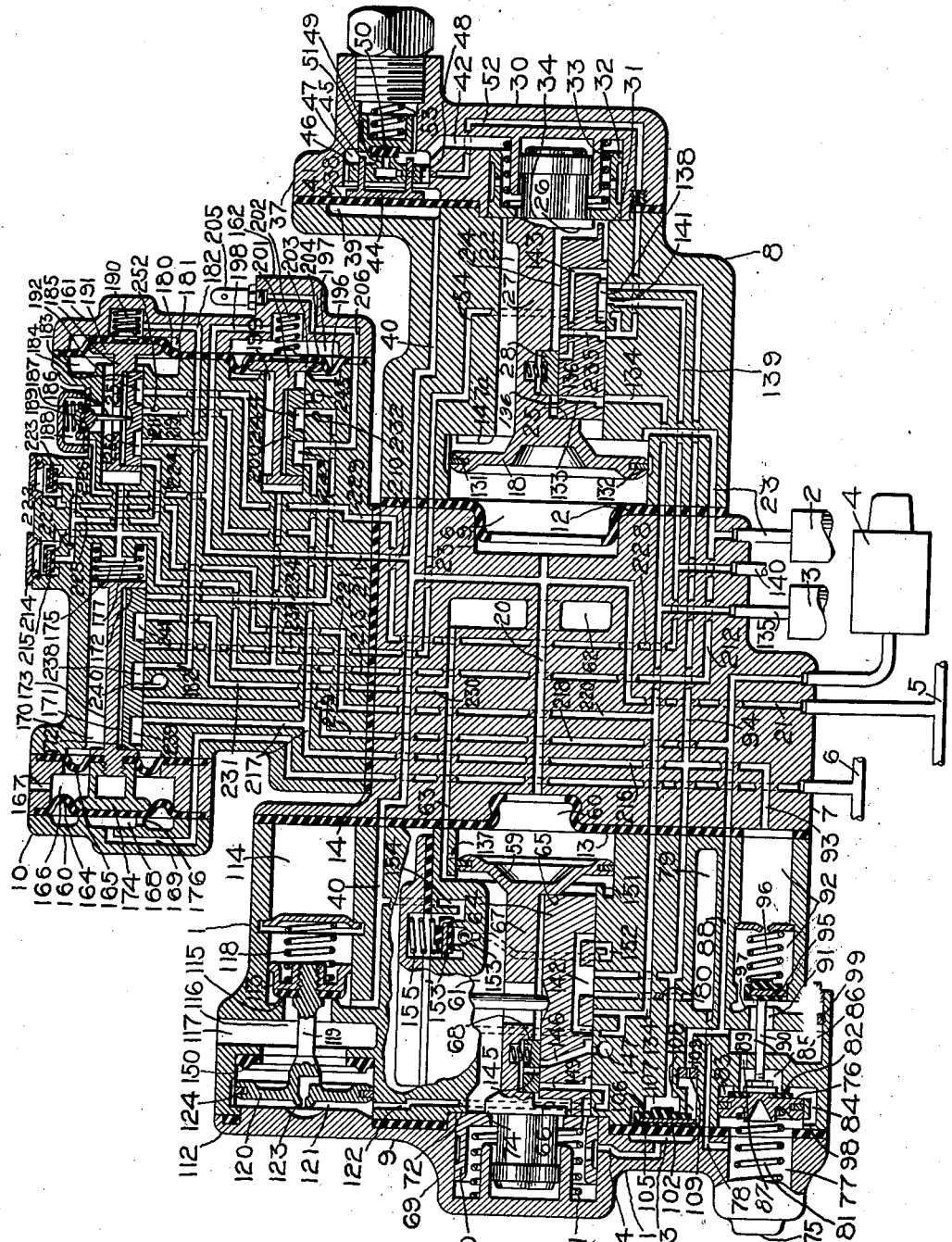
INVENTOR
Glenn T. McClure
BY
A. M. Higgins
ATTORNEY Patented Mar. 23, 1943

2,314,413

UNITED STATES PATENT OFFICE 2,314,413

BRAKE MEANS

Glenn T. McClure, McKeesport, Pa., assignor to The Westinghouse Air Brake Company, Wilmerding, Pa., a corporation of Pennsylvania Application October 31, 1941, Serial No. 417,292

36 Claims. (Cl. 303—23)

This invention relates to fluid pressure brakes and more particularly to the type which is controlled by pressure variations in a brake pipe for controlling the brakes on cars of a railway train.

On railways there are certain cars which are intended to be used in relatively slow speed, long freight train service as well as in the much shorter high speed freight or express train service and the braking requirements for these two different classes of service differ from each other to such an extend that a brake equipment which provides the desired braking control for one class of service fails to adequately meet the braking requirements of the other class of service. One reason for these different requirements is that the great amount of slack in long freight trains places certain limitations on the braking thereof in order to avoid damage to or wrecking of the trains, which limitations are however not present in shorter trains due to the smaller amount of slack.

It is well known that in the usual fluid pressure brake system the brake operations are initiated at the locomotive and travel through the brake pipe from the front of the train to the rear end thereof. In effecting an emergency application of the brakes, the brakes therefore tend to apply at the head of the train before applying at the rear of the train with the result that if the slack in the train is stretched out at the time of initiating the application it will be caused to run in toward the front of the train.

In long freight trains the amount of slack is so great that an emergency application of the brakes must therefore be so regulated or retarded as to first cause a gentle gathering of the slack in the train before applying the brakes with such force as is required to promptly bring the train to a stop. Otherwise the gathering of the slack in a long train toward the front end thereof might cause wrecking of the train.

In shorter trains, however, such as employed in fast freight or express service, it is not necessary to retard an emergency application of brakes as in long freight trains, due to the smaller amount of slack, and this is desirable in that it provides for quicker stopping of these higher speed trains than could otherwise be obtained.

In effecting a release of a brake application on a long freight train, if the brakes on the cars at the front of the train release too far in advance of those at the rear of the train, with the slack in the train gathered, the cars at the front end of the train may start moving away from the rear of the train due to the stretching out of slack, and under certain operating conditions this is liable to break a train in two. In order to prevent such from occurring in long freight trains it is therefore necessary to obtain as uniform a release of the brakes as possible throughout the whole train.

This uniform release of brakes on long freight trains is secured by restricting the charging of the brake reservoirs from the brake pipe on the cars at the front of the train so as to accelerate the flow of fluid under pressure through the brake pipe to the rear end of the train for obtaining the required increase in brake pipe pressure at the rear end to initiate the release of brakes, and by also retarding the release of fluid under pressure from the brake cylinders, in order that the brakes on the cars at the rear of the train will be released sufficiently soon with respect to those at the front end.

In relatively short fast freight or express trains however slack is not a material problem and due to the much shorter brake pipe the charging thereof at the rear of the train can be obtained more promptly and with less difficulty than on longer trains. Therefore on shorter trains a faster release of brakes and a faster recharging of the brake equipment on all cars of the train can be provided for than is permissible in the longer trains. This is very desirable in that it permits the provision of brake equipments for these shorter trains which is more quickly responsive to control operations by the engineer and thereby facilitates faster handling of such trains.

In the well known AB brake equipment which is now standard for use on cars for long freight train service there is an emergency portion which operates upon an emergency reduction in brake pipe pressure to supply fluid under pressure from a quick action chamber to a brake pipe vent valve for effecting a sudden, local, emergency venting of fluid under pressure from the brake pipe. The fluid under pressure is then gradually released from the quick action chamber through a choked passage to permit closure of the vent valve after a time period sufficient to insure complete venting of fluid pressure from the long brake pipe on such trains. After closure of these vent valves through the train the brakes may be released by recharging the brake pipe on the train.

At the present time there are many cars in service equipped with the K-type equipment which was standard before the AB equipment. Long freight trains may therefore comprise some cars equipped with the K-equipment mixed in with cars provided with the AB equipment. In the K-equipment a complete venting of fluid under pressure from the brake pipe in effecting an emergency application of brakes is not provided for as in the AB equipment. In order to ensure said complete venting in long freight trains it is therefore necessary that the vent valves of the AB equipment be held open, as above mentioned, for a period of time which is longer than would otherwise be necessary and this period of time is excessive and undesirable for shorter trains such as fast freight or express, in that at times it might result in an undue delay in getting such trains under way again following an emergency application of the brakes.

Brake equipments of the type usually employed on long freight trains are so designed as to provide a full service brake cylinder pressure of fifty pounds upon a twenty pound reduction in brake pipe pressure from a normal brake pipe pressure of seventy pounds. Any further reduction in brake pipe pressure cannot cause any further application of brakes since the pressure in the brake pipe and auxiliary reservoir will have equalized.

Brake equipment used on high speed trains, such as in express and fast freight service, are designed on the same pressure ratio basis as brake equipment used in long freight trains. However, in such service the normal brake pipe pressure carried is usually one hundred and ten pounds, and a full service, twenty pound reduction in such pressure will not provide equalization between the pressures in the brake pipe and auxiliary reservoir, as a result of which the brake pipe pressure may be further reduced by effecting what is known as an over-reduction and this will provide for further flow of fluid under pressure to the brake cylinder. In effecting a service application of the brakes on these shorter, high speed trains it is however undesirable to permit the brake cylinder pressure to be increased above that which provides a full service application and this has heretofore been prevented in brake equipment such as that employing the well known Westinghouse universal valve by the provision of a safety valve device adjusted to limit the brake cylinder pressure to the full service degree. In the universal valve the safety valve device is effective only in effecting a service application of the brakes and is cut out at the time an emergency application of the brakes is effected so as not to interfere with obtaining as quick a stop as possible of the train in an emergency.

From the above remarks it will now be noted that for long freight trains it is desirable to so retard or control an emergency application of the brakes as to avoid harsh, damaging gathering of slack. It is also desirable to hold the brake pipe vent valves open for a sufficient period of time to insure complete venting of the long brake pipe on such trains. It is further desirable to retard the charging of the brake reservoirs on the cars of such trains and to also retard the release of fluid under pressure from the brake cylinders on the cars. On the other hand, the brake equipment employed on relatively short trains such as used in fast freight or express service, may provide for faster emergency application of the brakes, quicker closing of the brake pipe vent valves, faster charging of the brake reservoirs on the cars of the train and faster or quicker release of fluid under pressure from the brake cylinders on the car. For these shorter trains it is also necessary to use a safety valve for limiting the degree of a service application of brakes.

One object of the invention is therefore the provision of an improved brake equipment which is capable of meeting the above described requirements for both relatively long, slow speed freight train service and the shorter, higher speed train service such as fast freight or express.

This object is attained by using the AB type of brake equipment with all its operating characteristics which are particularly suited to the control of long freight trains, and by the addition to said equipment of means adapted to operate only in connection with the shorter trains employed in fast freight or express service to provide the operating characteristics desired therefore.

Another object of the invention is the provision of an improved brake equipment such as just described embodying means which is automatically adjustable, in accordance with the class of service in which the equipment is disposed, to condition the brake equipment to provide the desired operating characteristics for that service.

Short high speed freight or express trains are provided with a single pipe which extends through the train and which is normally charged with fluid under pressure to provide for the transmission of signals from one location in the train to another. Long freight trains are not so equipped. According to the last object the means for automatically conditioning the brake equipment is arranged for control from the signal pipe so that when a car provided with the improved brake equipment is operated in fast freight or express service it will be automatically conditioned for such service by the pressure of fluid in the signal pipe. The lack of signal pipe pressure in long freight trains provides, on the other hand, for the automatic conditioning of the brake equipment for such service.

Other objects and advantages will be apparent from the following more detailed description of the invention.

In the accompanying drawing, the single figure is a diagrammatic view of a fluid pressure brake equipment embodying the invention.

Description

As shown in the drawing the brake equipment comprises a brake controlling valve device 1, an auxiliary reservoir 2, an emergency reservoir 3, a brake cylinder device 4, a brake pipe 5 and a signal pipe 6.

The brake controlling valve device 1 comprises a pipe bracket 7, a service application valve device 8 clamped on one face of said bracket, an emergency application valve device 9 clamped on an opposite face of said bracket, and a change-over valve device 10 clamped on a third face of said bracket, suitable gaskets 12, 13 and 14 being provided between each of said faces and the respective device.

The service and emergency application valve devices 8 and 9 may be identical in all respects to the corresponding parts of the AB brake equipment which is shown and fully described in Patent No. 2,031,213 issued on February 18, 1936, to Clyde C. Farmer. The pipe bracket may differ from that shown in this patent only in the provision of such passages as required to connect the change-over valve device 10 into the equipment.

and in the provision of the face upon which said device is mounted.

Since the service and emergency application valve devices 8 and 9 may be identical in all respects to those fully shown and described in the aforementioned patent, the description thereof to follow will be limited to such as deemed necessary to a clear understanding of the invention. Moreover, in the drawing certain of the devices shown and described in the aforementioned patent but which are not pertinent to the invention have been omitted for the purpose of simplicity.

The service application valve device 8 comprises a casing containing a piston 18 having at its face adjacent the pipe bracket a chamber 19 in constant communication with the brake pipe 5 through passages 20 and 21. At the opposite side of piston 18 is a valve chamber 22 in constant communication with the auxiliary reservoir 2 through a passage and pipe 23. In chamber 22 is a main slide valve 24 mounted between two spaced shoulders 25 and 26 provided on a stem 27 associated with the piston 18. An auxiliary slide valve 28 is mounted to slide on the main slide valve 24 and is disposed in a recess provided in the piston stem 27 for movement with said stem.

The open right-hand end of valve chamber 22 is closed by a cover 30 which is provided with a bore of larger diameter than but aligned with the valve chamber 22 so as to provide in the casing an annular shoulder 31 for engagement by a plunger 32 to limit movement thereof in the direction of the pipe bracket. The plunger 32 is slidably mounted in the bore of the cover 30 and is acted upon by a spring 33 which urges same in the direction of the shoulder 31. A shoulder 34 on the piston stem 27 is provided for engagement with the plunger 32 for moving same into the cover 30 against the pressure of the spring 33.

Associated with cover 30 is a release insuring valve device 37 which comprises a flexible diaphragm 38 clamped around its periphery between said cover and the casing. At one side of the diaphragm is a chamber 39 which is in constant communication with the brake pipe 5 through passages 40 and 21 while at the opposite side of the diaphragm is a chamber 41 in constant communication through passage 42 with valve chamber 22 and thereby with the auxiliary reservoir 2.

In chamber 41 is a diaphragm follower 44 adapted to be engaged by the diaphragm and provided with a plurality of struts or fingers 45 which are slidably mounted in suitable bores in a web 46 which separates the chamber 41 from a chamber 47, these chambers being in constant communication through one or more passages 48. The passage 42 is open to chamber 41 through chamber 47 and passages 48. The struts 45 extend into the chamber 47 to engage a valve piston 49 which is slidably mounted in a suitable bore and which carries on the end adjacent said struts a valve 50 arranged to cooperate with an annular valve seat 51 for controlling communication between the chamber 47 which encircles said seat and a passage 52 within the seat. The struts 45 are adapted to move the valve piston 49 in the direction of the right-hand for unseating the valve 50 from the seat rib 51 upon deflection of the diaphragm 39 in the same direction. A spring 53 acts on the valve piston 49 for urging the valve 50 into engagement with the seat rib 51 upon deflection of the diaphragm 38 in the opposite direction. The passage 52 leads to the seat of the main slide valve 24 and is also connected to a passage 54 which leads to the face engaging the gasket 12, the same as in the AB brake disclosed and described in the aforementioned patent.

The emergency valve device 9 comprises a casing containing a piston 59 having at the face adjacent gasket 13 a chamber 60 which also is in constant communication with the brake pipe through passages 20 and 21. At the opposite side of the piston 59 is a valve chamber 61 which is in constant communication with a quick action chamber 62 through a passage 63, the quick action chamber being provided in the pipe bracket 7. The valve chamber 61 contains a main slide valve 64 which is loosely mounted between spaced shoulders 65 and 66 provided on a stem 67 projecting from the piston 59. An auxiliary slide valve 68 is disposed in a recess in the piston stem 67 for movement therewith and is mounted to slide on the main slide valve 64.

The left-hand end of the valve chamber 61 is closed by a cover 69 in which there is slidably mounted a plunger 70 and which contains a spring 71 acting on the plunger for urging same in the direction of the pipe bracket into engagement with the shoulder 72. The piston stem 67 has a shoulder 74 for engaging the plunger 70 to move same against the force of spring 71.

Associated with the emergency valve device is an emergency delay valve device 75 which comprises a piston 76 slidably mounted in a bore, the outer end of which is closed by the cover 69. At the left-hand side of piston 76 is a chamber 77 connected by a passage 78 with a chamber 79 which in turn is connected by a passage 80 to the seat of the emergency main slide valve 64. The chamber 77 contains a spring 81 which acts on the piston 76 for urging same in the direction of the right-hand into engagement with an annular seat rib 82. With the piston 76 engaging the seat rib 82 a chamber 83 formed around said rib is open through a passage 84 to chamber 77. Within the seat rib 82 is a chamber 85 which is in constant communication with a chamber 86 through a passage 87, and the chamber 86 is in constant communication with brake cylinder device 4 through a passage and pipe 88.

The chambers 85 and 86 are separated by a wall 89 through which extends a stem 90 which is connected at one end to the piston 76. From chamber 86 this stem extends through a relatively large opening 91 into a chamber 92 which is in constant communication through passage 93 with a brake application and release passage 94 connected at one end to the seat of slide valve 24 in the service application valve device 8 and at the opposite end to the seat of the emergency slide valve 64.

Contained in chamber 92 is a check valve 95 which is urged against the end of the stem 90 by a spring 96. With the piston 76 in engagement with the seat rib 82 the check valve 95 is adapted to be unseated from an annular seat rib 97 as shown in the drawing to provide through opening 91 an unrestricted fluid flow communication between chambers 92 and 86. Under conditions to be later described the piston 76 is adapted to be moved in the direction of the left-hand into engagement with a gasket 98 under which condition the spring 96 is adapted to seat the check valve 95 against the seat rib 97. The chambers 92 and 86 are connected by a passage containing a choke plug 99 adapted to provide relatively slow flow of fluid under pressure from chamber 92 to chamber 86 with check valve 95 seated, as will be later brought out.

The emergency valve device also comprises a timing valve device 101 which comprises a flexible diaphragm 102 clamped between the cover 69 and the casing and having at one side a chamber 103 which is in constant communication through a passage 104 with the emergency valve chamber 61 and thereby the quick action chamber 62. A check valve 105 is associated with the opposite side of the diaphragm 102 and is adapted to be urged by the diaphragm under the influence of fluid pressure in chamber 103 into contact with an annular seat rib 106. Within the seat rib is a chamber 107 which is in constant communication with the brake application and release passage 94, while encircling the seat rib 106 is a chamber 108 which is open through a choke 109 to the brake cylinder passage 88. Under a condition to be later described the diaphragm 102 is adapted to be deflected in the direction of the left-hand for moving the check valve out of contact with seat rib 106 to thereby establish communication between the chambers 107 and 108.

The emergency valve device also embodies a brake pipe vent valve device 112 which comprises a valve piston 113 contained in a chamber 114 which is in constant communication with the brake pipe 5 through passages 40 and 21. One end of this valve piston is arranged to cooperate with an annular seat 115 for closing communication between chamber 114 and a chamber 116 which is open to the atmosphere through a passage 117. A spring 118 in chamber 114 acts on the valve piston 113 for urging same into seating contact with the seat 115. The valve piston 113 is connected by a stem 119 to an operating piston 120 one side of which is subject to the pressure of fluid in chamber 116 while at the opposite side is a chamber 121 which is connected by a passage 122 to the seat of the main emergency slide valve 64. The piston 120 has a choked release port 123 connecting the chamber 121 at one side to the chamber 116 at the opposite side and there is also a leakage groove 124 provided in the wall of the bore in which the piston is disposed for connecting the chambers 121 and 116 when the piston is in its normal position shown.

With the change-over valve device 10 conditioned to provide for the braking of long, relatively low speed freight train, all of which will hereinafter be described, the brake equipment as so far described will operate to control the brakes on such trains in the same manner as described in the aforementioned patent but which will now be set forth briefly.

*Operation—Long freight train-initial charging*

To initially charge the brake equipment fluid under pressure is supplied to the brake pipe 5 in the usual manner and flows therefrom to piston chambers 19 and 60 in the service application and emergency application valve devices 8 and 9, respectively, and also through the passages 21 and 40 to the vent valve chamber 114 and diaphragm chamber 39 in the release insuring valve device 37.

With piston 18 in the service application valve device in its normal release position shown fluid under pressure supplied to chamber 19 is adapted to flow through feed grooves 131 and 132 to valve chamber 22 and thence through passage 23 to the auxiliary reservoir 2 for charging said valve chamber and reservoir with fluid at the pressure supplied to the brake pipe 5. At the same time as the valve chamber 22 is thus charged, fluid under pressure supplied thereto flows through passage 42 to chamber 41 at the right-hand side of the diaphragm 38 in the release insuring valve device 37. With the pressures acting on the opposite sides of the diaphragm 38 substantially equalized the valve 50 will be seated under the action of spring 53.

With the piston 18 and thereby the slide valves 24 and 28 of the service application valve device 8 in their normal release position shown, an emergency reservoir charging port 133 in the main slide valve 24 is opened past the piston end of the auxiliary slide valve 28 to the valve chamber 22. The other end of the port 133 is in registry with a passage 134 which extends to the seat of the emergency slide valve 64 and which is connected by a passage and pipe 135 to the emergency reservoir 3. Through the communication just described fluid under pressure supplied to the valve chamber 22 is therefore adapted to flow to the emergency reservoir at a restricted rate determined by a choke 136 in port 133 for charging said reservoir with fluid at the pressure supplied to the brake pipe.

With the piston 59 and slide valves 64 and 68 of the emergency application valve device 9 in their normal release positions shown fluid supplied from the brake pipe to the piston chamber 60 is adapted to flow through a charging port 137 to passage 63 and thence in one direction to the quick action chamber 62 and in the opposite direction to the valve chamber 61 for charging said chambers with fluid at brake pipe pressure. Fluid supplied to the valve chamber 61 also flows through passage 104 to chamber 103 at the left-hand side of a timing valve diaphragm 102 and acts thereon to hold the check valve 105 in seating engagement with the annular seat rib 106.

With the main slide valve 24 of the service application valve device 8 in its release position the brake cylinder device 4 is open to the atmosphere through passage and pipe 88, chambers 86 and 92 in the delay valve device 75, passages 93 and 94, a cavity 138 in said valve, passage 139 and a pipe 140, thereby providing for a release of brakes. A choke 141 is provided in the brake cylinder release passage 139 adjacent the seat for the slide valve 24 and this choke is adapted to control or provide for the relatively slow rate of release of brake cylinder pressure and thereby of the brakes on long freight trains. Such a release of the brakes will be hereinafter described.

With the main slide valve 64 of the emergency application valve device 9 in its release position shown a cavity 142 therein connects chamber 79 and thereby piston chamber 77 in the delay valve device 75 through passage 80 to the brake application and release passage 94 and thereby the atmosphere along with the brake cylinder device 4. The chambers 83 and 85 at the opposite side of the delay valve piston 76 are also open to the atmosphere along with the brake cylinder device at this time and as a result the spring 81 is rendered effective to hold the piston 76 in engagement with the seat rib 82 in which position the check valve 95 is unseated as shown in the drawing. With emergency slide valve 64 in its release position passage 122 connected to the vent valve piston chamber 121 is lapped by the slide valve so that said chamber will be at atmospheric pressure due to the connection through the choke 123 to the atmospheric chamber 116. As a consequence, spring 118 is effective to hold the vent valve 113 seated against the seat rib 115.

*Long freight train-service—Application of brakes*

With the brake equipment fully charged as just described, if the engineer desires to effect a service application of brakes he effects a service reduction in the pressure in brake pipe 5 in the usual well known manner. The pressure of fluid in the piston chamber 19 of the service application valve device reduces at a service rate along with the reduction in pressure in the brake pipe 5 and since this rate is in excess of that at which auxiliary reservoir pressure in valve chamber 22 can reduce by flow to the brake pipe through the feed grooves 131 and 132, a differential of pressures is created on the piston 18 and effects movement thereof to its service application position which is defined by contact between said piston and the gasket 12.

As the piston 18 is thus moved in the direction of the gasket 12 it initially moves the auxiliary slide valve 28 on and relative to the main slide valve 24 for closing communication between the emergency reservoir charging passage 133 and valve chamber 22 and for opening communication between said valve chamber and a service port 143 provided in the main slide valve 24. At substantially the time that the service port 143 is thus opened to the valve chamber 22 the shoulder 26 on the end of the piston stem 27 engages the main slide valve 24 whereby further movement of the piston to its service position moves said main slide valve to its service position in which the service port 143 registers with the brake application and release passage 94.

Fluid under pressure is then adapted to flow from the valve chamber 22 and thereby from the auxiliary reservoir 2 to the application and release passage 94 and through said passage to check valve chamber 92 in the delay valve device 75 and also to the seat of the main emergency slide valve 64. Fluid under pressure thus supplied through passage 94 to the seat of the emergency slide valve flows through cavity 142 therein and passage 80 to chamber 79 and from said chamber through passage 78 to chamber 77 at the left-hand side of the delay valve piston 76. At the same time as this occurs, fluid under pressure supplied to the check valve chamber 92 flows past the open check valve 95 through opening 91, chamber 86 and passage 87 to chamber 85 at the right-hand side of the delay valve piston 76. The fluid pressures acting on the opposite sides of the delay valve piston 76 are thus balanced in effecting a service application of brakes so as to render the spring 81 effective to maintain the check valve 95 unseated as shown in the drawing. Fluid under pressure supplied from the auxiliary reservoir through the service application valve device 8 and past check valve 95 to chamber 86 in the delay valve device 75 is therefore adapted to flow through passage 68 to the brake cylinder device 4 for applying the brakes on the car.

Fluid under pressure thus continues to flow to the brake cylinder device 4 from the valve chamber 22 and auxiliary reservoir 2 until the pressure in the valve chamber 22 becomes reduced to a degree slightly lower than the reduced brake pipe pressure effective in piston chamber 19, at which time the piston 18 will move toward the right-hand relative to the main slide valve 24 for shifting the auxiliary slide valve 28 to lap position for closing communication between the valve chamber 22 and service application passage 143 in the main slide valve 24.

The degree of pressure thus obtained in the brake cylinder device 4 will therefore be limited in accordance with the degree of service reduction in brake pipe pressure effective in the piston chamber 19. If less than a full service reduction in brake pipe pressure is effected, a further reduction will cause operation of the piston 18 to provide a corresponding increase in pressure in the brake cylinder device. The maximum brake cylinder pressure is however obtained upon a full service reduction in brake pipe pressure, which in long freight train service will be a twenty pound reduction from a normal seventy pounds pressure in the brake pipe and upon such a reduction the pressure in the auxiliary reservoir 2 and brake cylinder device 4 will equalize at fifty pounds.

The rate at which fluid under pressure is supplied to the brake cylinder device 4 in effecting a service application of brakes is governed by the service rate of reduction of pressure in the brake pipe 5 and cannot exceed said rate, since in case the rate of reduction of pressure in the valve chamber 22 should tend to exceed the service rate of brake pipe reduction in the piston chamber 19, the piston will operate the graduating valve 28 to throttle the service port 143 and thereby the flow of fluid under pressure to the brake cylinder device 4. These operations are so well known by those skilled in the art that a more detailed description thereof is not deemed essential in the present application.

Upon a service rate of reduction in pressure in brake pipe 5 and thereby in the emergency piston chamber 60 the pressure in the emergency valve chamber 61 and quick action chamber 62 will tend to reduce by flow through the charging port 137 to piston chamber 61 but this port is so restricted that a differential of pressures will be obtained on the piston 59 to effect movement thereof in the direction of the right-hand. As the piston 59 is thus moved it shifts the auxiliary slide valve 68 on the main slide valve 64 to a position in which a port 145 in the auxiliary slide valve registers with a port 146 in the main slide valve. The port 146 is open at the seat of the main slide valve at this time to an atmospheric exhaust port 147 so that when the ports 145 and 146 are brought into registry fluid under pressure will be vented from the valve chamber 61 and quick action chamber 62 to the atmosphere. The rate of this venting will be regulated in accordance with the rate of reduction in brake pipe pressure by the degree of registry between the ports 145 and 146 so as to permit the pressure of fluid in the valve chamber 61 and quick action chamber 62 to reduce at substantially the same rate as the brake pipe pressure is reduced and thereby prevent obtaining a sufficient differential of pressures on the emergency piston 59 to cause further movement thereof in the direction of the right-hand. When the pressure of fluid in the emergency valve chamber 61 and quick action chamber 62 is thus reduced to or slightly below the brake pipe pressure acting in chamber 60 at the opposite side of piston 59, said piston will move the auxiliary slide valve 68 back to its release position shown for breaking communication between the ports 145 and 146 and thereby limiting the reduction in pressure in the valve chamber and quick action chamber to substantially the same degree as that in the brake pipe 5. The emergency piston 59 and graduating valve 68 will thus respond to each service reduction in brake pipe pressure to reduce the pressure in the valve chamber 61 and quick action chamber 62 to a like degree to prevent movement of the piston 59 further in the direction of the right-hand or past its service position.

*Long train operation—Release of brakes after service application*

To effect a release of brakes on a long train it is customary for the engineer to initially open the brake pipe directly to the main reservoir on the locomotive so that fluid at the relatively high pressure carried in the main reservoir may flow directly to the brake pipe for a period of time which may vary in accordance with the length of the train and in accordance with the preceding degree of reduction in brake pipe pressure. At the termination of this period of time the engineer then supplies fluid to the brake pipe at the pressure which is normally carried in the brake pipe.

When the brake pipe pressure acting on the service piston 18 is thus increased to a degree sufficient to overcome the opposing resistance to movement of the main slide valve 24 out of service position, said piston and slide valve are returned to the release position shown in which the feed grooves 131 and 132 are both open to provide for flow of fluid under pressure from the brake pipe to the auxiliary reservoir 2 for recharging same.

If the brake controlling valve device is at the head end of the train, the initial increase in brake pipe pressure effected as above described will be at such a rapid rate with respect to the capacity of feed grooves 131 and 132, that a differential of pressures will be built upon the service piston 18 to such a degree as to overcome spring 33. The service piston 18 will then move with the slide valves 24 and 28 to an inner position defined by contact of the piston with a shoulder 147a. In this inner position the feed groove 132 is closed to limit the amount of fluid taken from the brake pipe at the head of the train for recharging purposes, and thereby provide a greater amount of fluid under pressure for increasing the pressure in the brake pipe at the rear of the train. Thus the charging of the brake pipe at the rear of the train is not only accelerated by the initial supply of fluid at high pressure directly from the main reservoir, but also by operation of the brake controlling valve devices at the head of the train to limit the amount of fluid taken from the brake pipe.

When the pressure in valve chamber 22 and in the auxiliary reservoir 2 become increased sufficiently with respect to the opposing brake pipe pressure on the service piston 18, spring 33 is adapted to return said piston to its normal release position shown to provide for eventual equalization of the pressures in the brake pipe and auxiliary reservoir through both feed grooves 131 and 132.

At the rear of the train, the spring 33 will prevent movement of the service piston 18 to the inner position just mentioned, so that the auxiliary reservoir 2 will be recharged through both feed grooves 131 and 132 as rapidly as the brake pipe pressure is increased.

In both release positions of the main slide valve 24 of the service application valve device 8 the cavity 138 connects the brake application and release passage 94 to which the brake cylinder 4 is connected past the check valve 95 in the inshot valve device 75, to the release passage 139 so as to provide for release of fluid under pressure from the brake cylinder device 4 for releasing the brakes on the car. This release of fluid under pressure from the brake cylinder device is restricted by choke 141 as before mentioned and this restriction acting in conjunction with accelerated movement of the service application valve device 8 at the rear of the train to its release position, is intended to prevent a release of brakes at the head of the train so far in advance of those at the rear as to permit the front of the train to attain sufficient momentum in moving away from the rear of the train, under certain conditions of operation, as to cause braking of the train in two.

In the emergency valve device 2, the increase in brake pipe pressure in piston chamber 60, in effecting the release of a service application of brakes, merely causes a flow of fluid under pressure through the charging port 137 to the valve chamber 61 and quick action chamber 62 for recharging same to brake pipe pressure.

The brakes on a train will now be released and the brake system fully recharged with fluid under pressure for a subsequent brake operation, as will be apparent.

*Long freight train-emergency application of brakes*

If the engineer desires to effect an emergency application of brakes, he initiates at the locomotive a sudden emergency reduction in pressure in the brake pipe 5 in the usual manner and this emergency reduction is effective first on the brake controlling valve device 1 on the car adjacent the locomotive. In this device the emergency piston 59 responds to the emergency reduction in brake pipe pressure and moves first to service position above described. The capacity of the service ports 145, 146 and 147 is insufficient however to reduce the pressure in valve chamber 61 as fast as the brake pipe pressure is being reduced so that a sufficient differential of pressures is obtained on the emergency piston for moving same from service position to its emergency position defined by engagement with gasket 13. In service position of the piston 59, shoulder 66 on the piston stem 67 engages slide valve 64 so that movement of said piston to emergency position also moves said slide valve to emergency position.

At the time shoulder 66 on piston stem moves into contact with the main slide valve 64 the graduating valve 68 opens a passage 149 to the valve chamber 61. This passage at the seating face of the main slide valve registers with passage 122 leading to the vent valve piston chamber 121 so that when uncovered by the graduating valve a preliminary flow of fluid under pressure from the valve chamber 61 and the quick action chamber 62 to vent valve piston chamber 121 occurs. When the main slide valve 64 however is moved to its emergency position the passage 122 is opened past the end of said valve to the valve chamber 61 to provide for further flow of fluid under pressure from the valve chamber 61 and quick action chamber 62 to the vent valve piston chamber 121.

The pressure of fluid thus obtained in chamber 121 on the piston 120 is adapted to effect movement of said piston in the direction of the right-hand to move the vent valve 113 out of contact with the seat rib 115, so as to thereby open communication between the brake pipe passage 40 and chamber 116 which is open to the atmosphere through the passage 117. Through this communication fluid under pressure is adapted to be vented from the brake pipe 5 at an emergency rate for propagating the emergency reduction in brake pipe pressure initiated by the engineer to the next car in the train to the rear to thereby provide for serial emergency venting of the brake pipe throughout the train.

Upon an emergency reduction in brake pipe pressure in the brake pipe 5 the service application valve device 8 operates in the same manner as in effecting a service application of the brakes to supply fluid under pressure from the auxiliary reservoir 2 to the application and release passage 94. In emergency position of the emergency piston 59 and main slide valve 64 the passage 80 is lapped so as to prevent flow of fluid under pressure to the volume 79 and piston chamber 77 in the delay valve device 75 and at the same time as this occurs passage 134 connected to the emergency reservoir 3 is opened through the cavity 142 to the application and release passage 94 whereby both the auxiliary reservoir and emergency reservoir are placed in communication with the passage 94.

Fluid under pressure thus supplied to passage 94 from the two reservoirs flows through the passage 93 to chamber 92 and thence initially past the check valve 95 to the brake cylinder device 4 for initiating the application of brakes. At the same time as fluid is thus supplied to the brake cylinder device it also flows from chamber 86 through passage 87 to chamber 85 and acts on the right-hand face of the delay valve piston 76. Under this emergency condition chamber 77 at the opposite side of the delay valve piston 76 is not charged with fluid under pressure as in effecting a service application of brakes, so that only the pressure of spring 81 opposes the pressure of fluid in chamber 85 acting on the opposite face of the piston. The pressure of the spring 81 is such that when the pressure of fluid obtained in the brake cylinder device 4 and in chamber 85 at the opposite side of the piston 76 is increased to a certain relatively low degree, such as 15 pounds, said pressure will move the piston 76 in the direction of the left-hand into engagement with the gasket 98 whereupon spring 96 will seat the valve 95 so as to prevent further flow of fluid under pressure from chamber 92 through the opening 91 to the brake cylinder device 4 at the rate at which fluid pressure is supplied to the passage 94 by both the service and emergency application valve devices 8 and 9.

After the valve 95 is seated however fluid under pressure supplied to the chamber 92 continues to flow to the brake cylinder device 4 at a relatively slow rate by way of the choke plug 99 to thereby provide for a continued but relatively slow increase in pressure in the brake cylinder device.

While fluid under pressure is being supplied to the brake cylinder device 4 as just described, the pressure in the emergency valve chamber 61 and quick action chamber 62 is being gradually reduced to the atmosphere by way of the choked passage 123 in the vent valve piston 120, and as a consequence the pressure in chamber 103 on the left-hand side of diaphragm 102 of the timing valve device 101 is also being reduced. At the opposite side of this diaphragm the check valve 105 is subject in chamber 107 to the pressure of fluid supplied to the brake application and release passage 94, and in chamber 108 outside of the seat rib 106 this check valve is subject to the pressure of fluid being supplied to the brake cylinder device. The parts of the timing valve device are so proportioned that after the pressure in the brake cylinder device has been increased to a certain degree by the relatively slow flow of fluid through the choke passage 99, the forces on the right-hand side of the diaphragm will overbalance that on the left-hand side and as a result cause deflection of the diaphragm for unseating the check valve 105. With the check valve 105 unseated the brake application and release passage 94 is connected through the choke 109 to chamber 86 in the delay valve device and thus to the brake cylinder device 4 and through this communication fluid under pressure is therefore supplied to the brake cylinder device in addition to the supply through the choke plug 99 to thereby provide for an increase in the rate of emergency application. The degree of pressure obtained in the brake cylinder device 4 in effecting an emergency application of brakes is limited to equalization with the pressures originally existing in the auxliary reservoir 2 and emergency reservoir 3, as will be apparent.

From the above description it will be noted that in effecting an emergency application of brakes there is an initial, limited rapid inshot of fluid under pressure to the brake cylinder device 4 followed by a relatively slow rate of supply and finally by a faster rate of supply. The purpose of the initial limited rapid inshot of fluid pressure is to provide an application of brakes of such limited degree as to cause a gentle running in of the slack in a long freight train so as to avoid damage to any part of the train or wrecking thereof incident to slack gathering. Following the initial inshot of fluid to the brake cylinder device the gradual supply thereto through the choke 99 provides for a gradual increase in the brake application during the slack gathering period, at the termination of which the timing valve device 101 functions to provide an increased rate of flow of fluid under pressure to the brake cylinder device for promptly bringing the train to a stop after the slack in the train has been gathered. As before pointed out this delaying of an emergency application of brakes on a long freight train is required to insure that the train will be stopped without damaging same.

While the emergency piston 59 and main slide valve 64 are in their emergency positions, the pressure of fluid in the valve chamber 61 and quick action chamber 62 is being reduced through choked port 123 in piston 120 which during this operation is in sealing engagement with a gasket 150. When this pressure is thus reduced to a sufficiently low degree, spring 118 acting on the vent valve 113 is adapted to seat said valve and to return the piston 120 to its normal position. The volume of the valve chamber 61 and quick action chamber 62 are so related to the venting capacity of the port 123 through the vent valve piston 120 however that the vent valve 113 will be held open for a sufficient period of time to insure complete venting of all fluid from the brake pipe 5 in long slow speed freight trains, after which it will be closed as just mentioned in order to permit recharging of the brake pipe to release the brakes whenever desired.

*Long train operation—Release of brakes after an emergency application*

To effect a release of brakes after an emergency application the pressure in the brake pipe 5 may be increased by the engineer in the manner hereinbefore described.

At this time the emergency valve chamber 61 is at substantially atmospheric pressure, so that in the brake controlling valve device 1 adjacent the locomotive the initial increase in pressure in the brake pipe 5 and consequently in piston chamber 60 promptly creates a sufficient differential on the emergency piston 59 to move said piston and thereby the slide valves 68 and 64 to an outer position defined by contact between said piston and a stop 151 in the casing, this movement being opposed by the pressure of spring 71 on plunger 70 which is moved out of contact with the shoulder 72.

This outer position of piston 59 and main slide valve 64 is known as back-dump position and in this position the application and release passage 94 is opened through cavity 142 in the slide valve 64 to a passage 152. The passage 152 is open past two check valves 153 and 153' to a passage 154 leading to passage 49 which is in direct communication with the brake pipe 5 through the passage 21. With the emergency piston 60 and main slide valve 64 in its back dump position fluid under pressure is therefore adapted to flow from the brake cylinder device 4 past the check valve 95 to passage 94 and thence through cavity 142, passage 152 and past the check valves 153 and 153' directly to the brake pipe 5 for causing a local rapid increase in pressure therein. This increase in brake pipe pressure is transmitted to the next car to the rear in the train for causing similar operation of the emergency valve device on that car and thence serially through the train to the rear end thereof.

This flow of fluid under pressure from the brake cylinder device 4 to the brake pipe 5 continues to substantially equalization of the pressures therein after which the check valve 153' is seated by spring 155 acting thereon and the check valve 153 is seated by gravity so that as the brake pipe pressure is further increased back to normal by the supply from the locomotive there can be no flow of fluid past the check valves 153 and 153' to the seat of the emergency slide valve 64.

As the fluid pressure in the brake pipe and emergency piston chamber 60 is thus increased, fluid flows from said chamber through the charging port 137 to the valve chamber 61 and quick action chamber 62 for recharging same. When the pressure of fluid in the valve chamber 61 is thus increased to within a certain degree of brake pipe pressure acting in chamber 60, the pressure of spring 71 on plunger 70 returns said plunger to its normal position in contact with shoulder 72 and said plunger in so moving returns the main slide valve 64 and the emergency piston 59 to their normal positions shown.

The emergency valve piston 59 and slide valves 68 and 64 will be moved to their back-dump position just described upon initiating the increase in brake pipe pressure at the locomotive, and therefore before the piston 18 and slide valves 24 and 28 of the service application valve device 8 start moving out of their application positions, due to the fact that at the termination of an emergency application of brakes the valve chamber 22 is charged with fluid at the pressure existing in the auxiliary and emergency reservoirs. However, when the brake pipe pressure is eventually increased to a degree which sufficiently exceeds that in the valve chamber 22, the piston 18 and slide valves 28 and 24 will be returned to one or another of their release positions, depending upon the position of the brake controlling valve device in a train as before described for again supplying fluid under pressure to the auxiliary reservoir 2 and emergency reservoir 3 for recharging same to the pressure of fluid carried in the brake pipe and for opening the brake application and release passage 94 to the exhaust passage and pipe 140 for releasing the fluid under pressure remaining in the brake cylinder device 4 to effect a complete release of the brakes on the car.

*Operation of release insuring valve device 37*

Only a relatively low differential of pressures between that existing in the valve chamber 22 and that in the piston chamber 19 is normally required on the piston 18 for moving same and the slide valves 24 and 28 to their release positions. This differential may for instance be around a pound to one pound and a half. However if the condition of the piston 18 or some other part of the device is such as to require a greater differential on the piston for moving the parts to their release position the release insuring valve device 37 is adapted to operate to promptly create such differential to thereby insure movement of the parts to release position for effecting a release of brakes, as will now be described.

It will be noted that chamber 39 in the release insuring valve device is in constant communication with the brake pipe 5 while chamber 41 at the opposite side of diaphragm 38 is constantly open to the auxiliary reservoir so that said diaphragm is subject to the same opposing pressures as the piston 18. An increase in brake pipe pressure in chamber 39 will therefore tend to deflect the diaphragm 38 in the direction of the right-hand and the pressure required for causing such deflection is governed by the pressure of spring 53. This spring is so adjusted as to exert a pressure on the diaphragm 39 which will prevent deflection thereof by a differential which will normally operate the piston 18 to its release position shown but to permit deflection in case the differential between brake pipe and auxiliary reservoir increases above such normal degree. Thus in case this greater differential is obtained the diaphragm 39 will be moved toward the right-hand and in so moving unseat the valve 59 to connect chamber 47 which is open to valve chamber 22 and auxiliary reservoir 2 to passage 52 which leads to the seat of the main slide valve 24.

In service position of slide valve 24 passage 52 is open through cavity 138 to the brake cylinder release passage 139 so that when the valve 50 is unseated there will be a flow of fluid under pressure from valve chamber 22 to reduce the pressure in said chamber and thereby provide the required differential on the piston 18 for moving same back to its release position. As soon as the piston 18 thus operates the cavity 141 is moved out of registry with passage 52 so as to terminate the venting of fluid under pressure from the auxiliary reservoir.

Thus a service application valve device having higher than normal resistance to movement or which for any other reason fails to promptly return to release position upon an increase in brake pipe pressure will be caused to so operate upon operation of the release insuring valve device 37.

*Summary—Long freight train operation*

From the above description of the operation of the brake controlling valve device 1 for long, slow speed freight trains it will be noted that the device provides for a retarded emergency application of brakes due to operation of the inshot or delay valve device 75 and timing valve device 101. The brake pipe vent valve 113 is held open for a sufficient period of time to insure a complete venting of fluid under pressure from the long brake pipe on such a train. The charging of the auxiliary reservoir 2 and emergency reservoir 3 is restricted or controlled by the feed grooves 131 and 132 around the service application piston 18 in its normal position and the feed groove 131 by itself with said piston in contact with the shoulder 147, and the choke 136 in the main slide valve 24 provides for further restricting the charging of the emergency reservoir 3 in order to insure as prompt an increase in pressure in the brake pipe at the rear end of the train as possible to attain. In conjunction with this slow recharging of the reservoirs to obtain accelerated movement of the brake controlling valve devices at the rear end of the train to their release positions, the release of fluid under pressure from the brake cylinder device 4 is restricted by choke 141 in the release passage 139 so as to prevent the brakes at the head of the train being released so far in advance of those at the rear as to permit the train to stretch out with such force as to cause a train to break-in-two.

Now these features of retarded emergency application of brakes, holding the vent valve 113 open for a relatively long period of time, retarded recharging of the auxiliary and emergency reservoirs 2 and 3 and the restricting of the release of fluid under pressure from the brake cylinder device 4 while necessary to the control of long freight trains are not required and in fact are undesirable characteristics for a brake controlling valve device intended for use in relatively short and fast trains such as in fast freight or express service. When the brake controlling valve device 1 is also intended for use in such service, the change-over valve device 10 is adapted to be conditioned to change these characteristics to provide for efficient and effective handling of these shorter high speed trains. The construction and operation of the change-over valve device 10 will now be described.

*Change-over valve device 10—Description*

The change-over valve device 10 comprises a casing which is mounted against the third face of the pipe bracket 17 with the gasket 14 interposed between as above mentioned. In this casing there are three valve devices, namely, a control valve device 160 which is adapted to be controlled by or conditioned in accordance with the pressure of fluid in the signal pipe 6, a fast reservoir charging and brake cylinder release valve device 161 which is conditionable in accordance with the position of the device 160, and a valve device 162.

The control valve device 160 comprises two flexible diaphragms 164 and 165 which are spaced apart and clamped around their peripheries in coaxial relation forming an intermediate chamber 166 which is open to the atmosphere through a breather port 167. The diaphragm 164 is of greater area than diaphragm 165 and at its outer face is a chamber 168 which is in constant communication through a passage 169 with the signal pipe 6. At the outer face of the smaller diaphragm 165 is a valve chamber 170 containing a slide valve 171 which is mounted between spaced shoulders 172 of a stem 173 one end of which is connected to the diaphragm 165 for movement therewith. Interposed between the two diaphragms and operatively connecting them together is a spacer element 174. A spring 175 in the valve chamber 170 acts on stem 173 for urging the slide valve 171 and thereby the diaphragms 164 and 165 to the position shown in the drawing into contact with a stop rib 176 when the diaphragm chamber 168 is at atmospheric pressure. This is the position which the slide valve 171 will assume in long slow speed freight trains on which there is no signal pipe for connecting to signal pipe 6 which will therefore be open to the atmosphere.

When a car equipped with this brake controlling valve device is however coupled into a fast freight or express train in which a signal pipe is provided throughout the train, fluid under pressure supplied to said pipe and thereby pipe 6 will flow to diaphragm chamber 168 in the device 160 and this pressure acting on the diaphragm 164 will deflect same in the direction of the right-hand to a position defined by contact between stem 173 and a shoulder 177 in the casing and the device will be maintained in this position so long as the signal pipe 6 is maintained charged with fluid pressure. When the diaphragm 164 is deflected as just described it also moves the slide valve 171 to a position to the right of that shown for use in short train control. The slide valve 171 thus has two operating positions namely the position shown in the drawing for use when a car equipped with this brake controlling valve device is coupled into a long slow speed freight train and a position to the right of that shown for use when the car is used in fast freight or express service.

The valve device 161 comprises a flexible diaphragm 180 which is clamped around its periphery in the casing and which has at one side a chamber 181 connected through a passage 182 to the seat of slide valve 171 in the control valve device 160. At the opposite side of the diaphragm 180 is a valve chamber 183 containing a slide valve 184 which is connected through the medium of a stem 185 to the diaphragm 180 for movement therewith.

Above the slide valve 184 is a pin 186 having rocking contact at one end with said slide valve while the opposite end engages one side of a flexible diaphragm 187. At the opposite side of the diaphragm is a chamber 188 containing a spring 189 which acts through the diaphragm and pin 186 on the slide valve 184 for holding said slide valve into contact with its seat.

In chamber 181 is a spring 190 which acts on the diaphragm 180 for urging same and thereby the slide valve 184 to a left-hand position defined by contact between the flanged end 191 of the piston stem 185 which engages the diaphragm and a shoulder 192 on the casing.

The valve device 162 comprises a flexible diaphragm 196 clamped around its periphery in the casing and having at one side a chamber 197 which is connected to a passage 198. At the opposite side of the diaphragm 196 is a chamber 199 containing a slide valve 200 which is connected by a stem 201 to the diaphragm 196 for movement therewith. In chamber 197 there is a spring 202 which acts on the diaphragm 196 for urging same and thereby the slide valve 200 to their normal position shown defined by contact between the enlarged end 203 of stem 201 and a shoulder 204 on the casing. Associated with valve device 162 is a safety valve device 205 which is so adjusted as to limit the degree of a service application of the brakes when the brake controlling valve device is employed on a car operating in high speed freight or express service in which one hundred and ten pounds brake pipe pressure may be carried. The safety valve device 205 is connected by a passage 206 to the seat of slide valve 200.

In the pipe bracket 7 there is a passage 210 connected to brake pipe passage 40 and also through gasket 14 to passage 211 which connects to passage 198 leading to diaphragm chamber 197 of the valve device 162, to the seating face of the slide valve 184 and to diaphragm chamber 188 in the valve device 161 whereby these chambers are constantly supplied with fluid under pressure from the brake pipe and said pressure also constantly acts on the seating face of the slide valve 184. To prevent the slide valve 184 from being blown from its seat particularly during initial charging of the brake pipe 5, brake pipe pressure is effective in the diaphragm chamber 188 as above mentioned and therefore acts on the diaphragm 187 to apply seating force through the pin 186 on the slide valve 184.

In the pipe bracket there is also a passage 212 which connects the auxiliary reservoir passage 23 to the gasket 14 through which it is connected to the passage 213 leading to the slide valve chambers 170, 183 and 199 and also to a chamber 214 containing a check valve 215.

The pipe bracket further has a passage 216 connecting the application and release passages 94 through the gasket 14 to a passage 217 leading to the seat of slide valves 171 and 200. The brake cylinder passage 88 in the pipe bracket 7 is connected by a passage 218 to gasket 14 through which it is connected to a passage 219 leading to the seat of slide 171. The emergency reservoir charging passage 134 in pipe bracket 7 is also connected by a passage 220 to the gasket 14 through which it is connected to a passage 221 leading to a chamber 222 which contains a check valve 223.

A passage 224 connected to the seat of slide valve 184 leads to a passage 225 which in one direction is connected through a choke 226 to the underside of the check valve 223, while the passage 225 leads in the opposite direction through a choke 227 to the seating side of the check valve 215. The pipe bracket 7 also has a passage 228 connecting the brake cylinder release pipe and passage 140 to the gasket 14 for connection with a passage 229 which leads to the seat of slide valve 184. Also there is provided in the pipe bracket a passage 230 connecting the quick action chamber 62 by passage 63 to the gasket 14 through which the passage 230 is connected to a passage 231 leading to the seat of slide valve 171.

In the service application valve device 8, passage 54 connected to passage 52 from the release insuring valve device 37 and supplied with fluid under pressure through port 235 in the main slide valve 24 when in its release position and vented to the atmosphere when the slide valve is in service position as above described, extends to the gasket 12 and through said gasket is connected to a passage 236 in pipe bracket 7. The passage 236 leads to gasket 14 and through same is connected to passage 237 leading to the seat of slide valve 171.

With the slide valve 171 positioned for long freight train operation as shown in the drawing, a cavity 238 in said valve connects passage 182 from diaphragm chamber 181 of the valve device 161 to vent port 240. Under this condition the diaphragm chamber 181 will therefore be at atmospheric pressure and since the chamber 183 at the opposite side of the diaphragm 180 is constantly charged with fluid under pressure from the auxiliary reservoir 2 said diaphragm and thereby the slide valve 184 will be maintained in their outer positions shown in which there are no communications established through the slide valve 184. There are also two cavities 239 and 241 in the slide valve 171 but in the position shown for long freight train operation no communication is established through these cavities.

In the valve device 162 the diaphragm 196 is controlled by the opposing pressures of the auxiliary reservoir on the slide valve side and brake pipe on the opposite side and when these pressures are equal, as well as upon a service rate of reduction in pressure in the brake pipe and therefore in diaphragm chamber 197, the spring 202 is adapted to maintain the diaphragm 196 and slide valve 200 in the positions shown in the drawing and the only communication established in this position is through a cavity 243 between passage 217 connected to the brake application and release passage 94 and passage 206 leading to the safety valve device 205. The safety valve device will thus be connected to the brake cylinder device 4 in effecting a service application of brakes on long freight trains but this is of no consequence since the setting of the safety valve device is adjusted for high speed freight or express service and therefore in excess of the pressure obtainable in the brake cylinder device 4 in long freight train slow speed service.

Upon an emergency reduction in pressure in brake pipe 5 and therefore in the pressure in diaphragm chamber 197 of the valve device 162 the auxiliary reservoir pressure acting in chamber 199 on the opposite side of the diaphargm 196 is adapted to deflect said diaphragm in the direction of the right-hand into contact with the casing and this movement of the diaphragm is adapted to shift the slide valve 200 from the position shown to a position to the right-hand in which communication between the brake application and release passage 217 and the safety valve passage 205 is broken so as to thereby disconnect the safety valve device from the brake cylinder device in emergency and thus prevent the release of fluid at relatively high emergency pressure from the brake cylinder device 4. In this right-hand position of the slide valve 200 a cavity 244 therein connects a passage 234 to a vent port 245 but this is of no consequence at this time since the passage 234 is lapped by slide valve 171 in the valve device 160.

From the above description it will be apparent that with the parts of the change-over valve device 10 conditioned as shown in the drawing, due to the lack of signal pipe pressure in diaphragm chamber 168, as will be the case on long freight trains, no communications are established which will in any way change the operation of the brake controlling valve device 1 from that above described. Thus in long freight trains the brake controlling valve device 1 will operate as above described to provide the desired operating characteristics for that class of service.

*High speed freight or express train operation*

If a car equipped with this improved brake controlling valve device is coupled into a high speed freight or express train, the charging of the signal pipe 6 on the train will cause fluid under pressure to be supplied to chamber 168 in the valve device 160 and this pressure acting on the larger diaphragm 164 is adapted to overcome the auxiliary reservoir pressure acting in valve chamber 170 on the smaller diaphragm 165 and move the diaphragms 164 and 165 and the slide valve 171 from the long train operating positions in which they are shown in the drawing to the short train operating positions defined by contact between the stem 173 and shoulder 177.

In this short train position of slide valve 171 cavity 239 therein connects the application and release passage 217 to passage 219 which leads to the brake cylinder passage 88 in the pipe bracket and it will be noted that this communication opens a by-pass around the emergency delay valve 95 in the emergency application valve device 9 so that in effecting an emergency application of the brakes as above described the emergency delay valve 95 will be ineffective and a rapid flow of fluid under pressure from both the auxiliary reservoir and emergency reservoir directly to the brake cylinder device 4 will therefore be obtained in order to secure the rapid emergency application of brakes desired on the short train.

The cavity 241 in the slide valve 171 opens communication between passage 231 connected with the quick action chamber 62 and passage 234 leading to the seat of the slide valve 200 whereby when the valve device 162 moves to its right-hand outer position upon an emergency reduction in brake pipe pressure fluid under pressure will be vented from the quick action chamber 62 and emergency valve chamber 61 directly to the atmosphere through passage 234 containing choke 232, cavity 244 in slide valve 200 and vent port 245 in addition to the venting of fluid under pressure through port 123 in the vent valve piston 120 to thereby provide for quicker closing of the vent valve 113 in short train operation and thus permit a quicker release of the brakes after an emergency application than is obtainable on long freight trains as above mentioned.

With the valve device 162 in the normal position shown it will be apparent that the safety valve device 205 will be effective to limit in the usual manner the degree of pressure obtained in the brake cylinder device 4 upon a service application of brakes on short high speed freight or express trains which normally carry one hundred and ten pounds pressure in the brake pipe but with the parts of the device 162 in their outer right-hand position upon an emergency reduction in brake pipe pressure, the safety valve device 205 will be rendered ineffective and a maximum degree of pressure will be obtainable in the brake cylinder device 4 in order to provide for as short a stop of the train as possible in emergency.

It will be noted that when the valve device 160 is in the position shown for long freight train operation, communication between the passages 230 and 234 is broken by slide valve 171 so that operation of the valve device 162 upon an emergency reduction in brake pipe pressure cannot cause an increase in the rate of reduction in pressure in the quick action chamber 62 and emergency valve chamber 61 over that desired for such service as governed by the vent port 123 in the vent valve piston 120.

When the parts of the valve device 160 are in their right-hand position for short train operation, the cavity 238 in the slide valve 171 connects the passage 182 to passage 237 thereby placing the diaphragm chamber 181 of the valve device 161 in communication with passage 54 which is connected to the seat of the main slide valve 24 in the service application valve device 8.

In release position of the slide valve 24 port 235 therein connects the valve chamber 22 to passage 54 whereby fluid at auxiliary reservoir will be supplied to diaphragm chamber 181 and equalize with the fluid presure on the opposite side of the diaphragm 180 whereupon the spring 190 will maintain the diaphragm and thereby the slide valve 184 in a position to the left of that shown in the drawing and defined by contact between the diaphragm follower 191 and the shoulder 192.

When the slide valve 24 of the service application valve device is moved out of release position however, the passage 54 will be open to atmosphere through cavity 138 and the brake cylinder release passage 139 as above mentioned, so that fluid under pressure will be vented from diaphragm chamber 181 of the valve device 161 and auxiliary reservoir pressure in valve chamber 183 will therefore move the diaphragm against the spring 190 to a position defined by contact between the diaphragm and the end wall of chamber 181.

Thus, when the parts of the service application valve device 8 are in their release position, the slide valve 184 of the device 161 will occupy a position to the left of that shown, while when the parts of the service application valve device are moved out of the release position, the slide valve 184 will occupy the position shown, this change in position of the slide valve 184 occurring only in short train operation when the slide valve 171 of the valve device 160 is in its right-hand position, as above mentioned.

The slide valve 184 is provided with two cavities 250 and 251. In the left-hand position of the valve 184 the cavity 250 connects the brake pipe passage 211 to passage 224 and cavity 251 connects the brake application and release passage 217 to passage 229 leading to the brake cylinder release pipe and passage 140. When the service application valve device 8 moves however to its service position in effecting either a service or an emergency application of brakes the slide valve 184 occupies its right-hand position so as to break communication between the brake pipe passage 211 and passage 224 and between the application and release passage 217 and the brake cylinder release passage 228. The breaking of this last named communication is essential to prevent loss of fluid under pressure from the application and release passage 94 to the brake cylinder release pipe 140 while supplying fluid under pressure through said passage for actuating the brake cylinder device in order to apply the brakes. The breaking of the communication between the brake pipe passage 211 and the passage 224 is however of no consequence while effecting an application of brakes.

In effecting a release of brakes after an application the parts of the valve device 161 will remain in their right-hand position maintaining closed the communications controlled thereby until after the piston 18 and main slide valve 24 are moved from their service or lap position to release position for supplying fluid under pressure to the diaphragm chamber 181 to permit the spring 190 to move the slide valve 184 back to its left-hand position. When this occurs, the brake application and release passage 217, which is in communication with the brake cylinder device 4, is opened to the brake release passage and pipe 149 by way of the cavity 251 in order that fluid under pressure may be released from the brake cylinder device through this communication at a rate determined by a choke 252 provided in the passage 217 immediately below the slide valve 184. At this same time, fluid under pressure is also being released from the brake cylinder device by way of cavity 138 and choke 141 controlled by the slide valve 24 of the service application valve device as hereinbefore described. It will however be noted that the release communication including the choke 252 bypasses the usual release choke 141 or is arranged parallel thereto and provides for a faster release of fluid under pressure from the brake cylinder device than is possible of attainment in long freight train operation in which all such release is controlled by the choke 141.

When the slide valve 184 is returned to its left-hand position upon movement of the service slide valve 24 to its released position following an application of brakes, the cavity 253 in the slide valve 184 connects the brake pipe passage 211 to passage 224 which provides for the flow of fluid under pressure from the brake pipe through the choke 227 to the underside of the check valve 215 and when the pressure in the brake pipe exceeds that in the auxiliary reservoir acting above said check valve the check valve will be unseated to allow flow of fluid under pressure from the brake pipe to the auxiliary reservoir at a rate determined by the choke 227. This supply of fluid to the auxiliary reservoir is in addition to the supply through the feed grooves 131 and 132 around piston 18 of the service application valve device 8 to thereby provide in short train operation for faster recharging of the auxiliary reservoir than is obtainable in long train operation.

Fluid under pressure supplied from the brake pipe passage 224 to passage 225 also flows through choke 226 to the underside of the check valve 223 the upper side of which is in communication with the emergency reservoir 3, so that whenever the brake pipe pressure is increased to a degree which exceeds that in the emergency reservoir, the check valve 222 will be unseated and permit the flow of fluid under pressure from the brake pipe to the emergency reservoir for accelerating the recharge thereof.

From the above description, it will be apparent that fluid under pressure is not used from the emergency reservoir in effecting a service application of brakes but in releasing such an application a back flow from the emergency reservoir occurs to the auxiliary reservoir by way of port 133 in the main slide valve 24 past the end of the graduating valve 28 when the parts of the service application valve device are returned to their release position in order to expedite charging of the auxiliary reservoir. Thus the pressure of fluid in the emergency reservoir will become somewhat reduced in effecting a release of brakes after a service application so that there will be some flow of fluid under pressure past the check valve 223 to said reservoir under such a condition. In effecting an emergency application of brakes, however, the emergency reservoir pressure is reduced to equalization with that in the auxiliary reservoir by flow to the brake cylinder device 4 so that in releasing the brakes after such an application the check valve 223 will be unseated at substantially the same time as the auxiliary reservoir charging check valve 215 to provide for increased flow of fluid under pressure to the emergency reservoir at a rate determined by choke 226. Thus in effecting a release of brakes on a short fast freight or express train after either a service or an emergency application both reservoirs will be recharged quicker and a quicker release of fluid under pressure from the brake cylinder device will be obtained than is provided for in a long train operation under which condition the parts of the valve device 161 will be constantly maintained in the outer right hand position.

As above mentioned the additional charging communication for the two reservoirs by way of the slide valve 184 is not opened until after the parts of the service application valve device 8 are returned to their release position. Otherwise, while attempting to obtain a sufficient differential on the piston 18 of the service application valve device upon an increase in brake pipe pressure for moving same to its release position there might be a flow of fluid under pressure past, the check valve 215 to the auxiliary reservoir which would cause an increase in pressure in valve chamber 22 to offset the increase in brake pipe pressure in chamber 19. As a result it might be difficult or nearly impossible to obtain a sufficient differential on the piston 19 to cause movement thereof to release position. Such movement is however assured by preventing flow of fluid under pressure from the brake pipe through the valve device 161 to the auxiliary reservoir until after the parts of the service application valve device have been returned to their release position.

*Summary*

It will now be noted that the improved valve device is automatically adjustable or conditionable in accordance with either long freight train service or short fast freight or express train service to provide the desired brake operating characteristic for each of said services. The automatic conditioning for the short train service is obtainable by the pressure employed in the signal pipe of such trains, while the conditioning for the long freight train service is obtainable automatically due to the lack of signal pipe pressure on such trains.

The well known AB brake equipment provides the desired brake operating characteristics for long freight trains and the improved brake controlling device 1 embodies the service and emergency application valve devices of such equipment without change, while the change-over valve device when conditioned for long freight train operation provides for the usual operation of said service and emergency application valve devices. When the change-over valve device however is conditioned for short train operation, it opens up additional communications to provide for the various accelerated or other operations required for such service, as will now be apparent.

Having now described my invention, what I claim as new and desire to secure by Letters Patent, is:

1. In a fluid pressure brake, in combination, a brake pipe, a signal pipe, a source of fluid under pressure, valve means operative upon a reduction in brake pipe pressure to supply fluid under pressure from said source through a communication to effect an application of brakes, delay means operative to retard the flow of fluid under pressure through said communication, a valve controlling a by-pass around said delay means and operative to either close said by-pass to provide for the flow of fluid under pressure being controlled by said delay means or to open said by-pass to provide for a faster rate of flow of fluid under pressure, movable abutment means connected to said valve and open at one side to said signal pipe, said abutment means being operative upon supply of fluid under pressure to said signal pipe to condition said valve to open said by-pass, and means for automatically actuating said valve to close said by-pass when said signal pipe is void of fluid pressure.

2. In a fluid pressure brake, in combination, a brake pipe, brake cylinder means, a source of fluid under pressure, brake controlling valve means operative upon a reduction in brake pipe pressure to supply fluid under pressure from said source to said brake cylinder means to effect an application of brakes and operative upon an increase in brake pipe pressure to establish a communication for releasing fluid under pressure from said brake cylinder means to effect a release of said brakes, choke means in said communication arranged to restrict the release of fluid under pressure from said brake cylinder means, a release communication by-passing said choke means for releasing fluid under pressure from said brake cylinder means at the same time as fluid under pressure is released through said choke means, a valve device controlling the last named communication and having one position for opening same and another position for closing same, and means operative to selectively position said valve device.

3. In a fluid pressure brake, in combination, a brake pipe, brake cylinder means, a source of fluid under pressure, a brake controlling device operative upon a reduction in brake pipe pressure to supply fluid under pressure from said source to said brake cylinder means to effect an application of brakes and operative upon an increase in brake pipe pressure to establish a release communication for releasing fluid under pressure from said brake cylinder means to effect a release of said brakes, choke means in said release communication arranged to restrict the release of fluid under pressure from said brake cylinder means, another communication for releasing fluid under pressure from said brake cylinder means independently of but in addition to the release through said choke means, a valve controlling the last named communication having one position for closing same and another position for opening same, and means for positioning said valve.

4. In a fluid pressure brake, in combination, a brake pipe, brake cylinder means, a source of fluid under pressure, brake controlling valve means operative upon a reduction in brake pipe pressure to supply fluid under pressure from said source through a passage to said brake cylinder means for effecting an application of brakes and operative upon an increase in brake pipe pressure for connecting said passage to the atmosphere for releasing fluid under pressure from said brake cylinder means to effect a release of said brakes, a choke for limiting the rate of release of fluid under pressure through said passage from said brake cylinder means, valve means controlling a brake cylinder release communication connected at one end to said passage at the brake cylinder means side of said choke and open at the opposite end to atmosphere for also releasing fluid under pressure from said brake cylinder means independent of said choke, a choke in the last named release communication for controlling the rate of release of fluid under pressure from said brake cylinder means therethrough, said valve means having one position for opening the release communication controlled thereby and another position for closing same, and means for positioning said valve means.

5. In a fluid pressure brake, in combination, a brake pipe, brake cylinder means, a source of fluid under pressure, brake controlling valve means operative upon a reduction in brake pipe pressure to supply fluid under pressure from said source to said brake cylinder means to effect an application of brakes and operative upon an increase in brake pipe pressure to establish a communication for releasing fluid under pressure from said brake cylinder means to effect a release of said brakes, another communication which is independent of said brake controlling valve means for also releasing fluid under pressure from said brake cylinder means, a valve device controlling said other communication and having one position for opening same and another position for closing same, and means for selectively positioning said valve device.

6. In a fluid pressure brake, in combination, a brake pipe, brake cylinder means, a source of fluid under pressure, brake controlling valve means operative upon a reduction in brake pipe pressure to supply fluid under pressure from said source to said brake cylinder means to effect an application of brakes and operative upon an increase in brake pipe pressure to establish a communication for releasing fluid under pressure from said brake cylinder means to effect a release of said brakes, choke means in said communication arranged to restrict the release of fluid under pressure from said brake cylinder means, a release communication by-passing said choke means for releasing fluid under pressure from said brake cylinder means at the same time as fluid under pressure is released through said choke means, a valve device controlling the last named communication and having one position for opening same and another position for closing same, and means operative to selectively position said valve device, the first named communication being independent of said valve device and the second named communication being independent of said brake controlling valve means.

7. In a fluid pressure brake, in combination, a brake pipe, brake cylinder means, a source of fluid under pressure, brake controlling valve means operative upon a reduction in brake pipe pressure to supply fluid under pressure from said source to said brake cylinder means to effect an application of brakes and operative upon an increase in brake pipe pressure to establish a communication for releasing fluid under pressure from said brake cylinder means to effect a release of said brakes, another communication which is independent of said brake controlling valve means for also releasing fluid under pressure from said brake cylinder means, a valve device controlling said other communication and having one position for opening same and another position for closing same, a signal pipe, means operative upon supply of fluid under pressure to said signal pipe to condition said valve device for opening the communication controlled thereby, and other means operative upon release of fluid under pressure from said signal pipe to condition said valve device to close the communication controlled thereby.

8. In a fluid pressure brake, in combination, a brake pipe, brake cylinder means, a source of fluid under pressure, brake controlling valve means operative upon a reduction in brake pipe pressure to supply fluid under pressure from said source to said brake cylinder means to effect an application of brakes and operative upon an increase in brake pipe pressure to establish a communication for releasing fluid under pressure from said brake cylinder means to effect a release of said brakes, another communication which is independent of said brake controlling valve means for also releasing fluid under pressure from said brake cylinder means, a valve device controlling said other communication and having one position for opening same and another position for closing same, control means arranged for control by said brake controlling valve means for actuating said valve device to close the communication controlled thereby upon operation of said brake controlling valve means to supply fluid under pressure to said brake cylinder means and to open the last named communication upon operation of said brake controlling valve means to open the first named communication, means conditionable to render said control means either responsive or non-responsive to operation of said brake controlling valve means, and means for actuating said valve device to close the communication controlled thereby when said control means is rendered non-responsive to operation of said brake controlling valve means.

9. In a fluid pressure brake, in combination, a brake pipe, brake cylinder means, a source of fluid pressure, a brake controlling valve device operative upon a reduction in brake pipe pressure to supply fluid under pressure from said source to a passage for supply to said brake cylinder means to effect an application of brakes and operative upon an increase in brake pipe pressure to connect said passage with an atmospheric vent for releasing fluid under pressure from said brake cylinder means to effect a release of said brakes, delay means operative to retard the flow of fluid under pressure from said passage to said brake cylinder means but providing for unretarded flow of fluid under pressure in the opposite direction from said brake cylinder means to said passage, valve means controlling a communication between said passage and brake cylinder means around said delay means for providing a faster rate of flow of fluid under pressure from said passage to said brake cylinder means, and another communication between said passage and atmosphere for releasing fluid under pressure from said brake cylinder device independently of the release through said brake controlling valve device, said valve means having one position for opening both communications controlled thereby and another position for closing both of such communications, and means operative to selectively control the position of said valve means.

10. In a fluid pressure brake, in combination, a brake pipe, brake cylinder means, a source of fluid pressure, a brake controlling valve device operative upon a reduction in brake pipe pressure to supply fluid under pressure from said source to a passage for supply to said brake cylinder means to effect an application of brakes and operative upon an increase in brake pipe pressure to connect said passage with an atmospheric vent for releasing fluid under pressure from said brake cylinder means to effect a release of said brakes, delay means operative to retard the flow of fluid under pressure from said passage to said brake cylinder means but providing for unretarded flow of fluid under pressure in the opposite direction from said brake cylinder means to said passage, valve means controlling a communication between said passage and brake cylinder means around said delay means for providing a faster rate of flow of fluid under pressure from said passage to said brake cylinder means, a release valve device for releasing fluid under pressure from said brake cylinder means through said passage independently of said brake controlling valve means and having one position to provide for such release and another position to close the release communication controlled thereby, means for actuating said valve means to the position for opening the communication controlled thereby and to another position for closing same, said release valve device being conditioned to close the release communication controlled thereby upon movement of said valve means to the position for closing the application communication controlled thereby, said release valve device in the other position of said valve means being controlled by said brake controlling valve means and being operative in the release position thereof to open the brake cylinder release communication controlled thereby and to close such communication upon operation of said brake controlling valve means to supply fluid under pressure to said passage for effecting an application of brakes.

11. In a fluid pressure brake, in combination, a brake pipe, brake cylinder means, a source of fluid under pressure, two application communications for conveying fluid under pressure to said brake cylinder means, delay means for retarding the flow of fluid under pressure through one of said application communications to said brake cylinder means, two release communications for releasing fluid under pressure from said brake cylinder means, brake controlling means operative upon a reduction in brake pipe pressure to close one of said release communications and to supply fluid under pressure to said two application communications for flow to said brake cylinder means and operative upon an increase in brake pipe pressure to open said one release communication for releasing fluid under pressure from said brake cylinder means, valve means controlling the other application communication and release communication and selectively conditionable to either open or close same, and means for selectively conditioning said valve means.

12. In a fluid pressure brake, in combination, a brake pipe, brake cylinder means, a source of fluid under pressure, two application communications for conveying fluid under pressure to said brake cylinder means, delay means for retarding the flow of fluid under pressure through one of said application communications to said brake cylinder means, two release communications for releasing fluid under pressure from said brake cylinder means, brake controlling means operative upon a reduction in brake pipe pressure to close one of said release communications and to supply fluid under pressure to said two application communications for flow to said brake cylinder means and operative upon an increase in brake pipe pressure to open said one release communication for releasing fluid under pressure from said brake cylinder means, valve means controlling the other application communication and selectively conditionable to either open or close same, means for conditioning said valve means, and a valve device controlling the other release communication and conditionable by said valve means to close said other release communication when said valve means is conditioned to close the said other application communication, said valve device upon conditioning of said valve means to open the said other application communication being controllable by said brake controlling means and operative upon operation of said brake controlling means to supply fluid under pressure to said application communications to close said other release communication, and upon operation of said brake controlling means to release fluid under pressure from said brake cylinder means through said one release communication to open the said other release communication.

13. In a fluid pressure brake, in combination, a brake pipe, brake cylinder means, a source of fluid under pressure, two application communications for conveying fluid under pressure to said brake cylinder means, delay means for retarding the flow of fluid under pressure through one of said application communications to said brake cylinder means, two release communications for releasing fluid under pressure from said brake cylinder means, brake controlling means operative upon a reduction in brake pipe pressure to close one of said release communications and to supply fluid under pressure to said two application communications for flow to said brake cylinder means and operative upon an increase in brake pipe pressure to open said one release communication for releasing fluid under pressure from said brake cylinder means, a signal pipe, and valve means controlling the other application communication and the other release communication and conditionable by fluid pressure in said signal pipe to render such other communications effective, and means for actuating said valve means when said signal pipe is void of fluid pressure to render said other communications ineffective.

14. In a fluid pressure brake, in combination, a brake pipe, brake cylinder means, two release communications for releasing fluid under pressure from said brake cylinder means, a brake controlling valve device controlling one of said release communications and movable upon a reduction in pressure in said brake pipe to an application position to close same and to supply fluid under pressure to said brake cylinder means for effecting an application of brakes, said brake controlling valve device being movable from said application position upon an increase in brake pipe pressure to a brake release position for opening said one release communication for releasing fluid under pressure from said brake cylinder means, and valve means controlling the other release communication and adapted to be controlled by said brake controlling valve device to open said other release communication in the release position of said brake controlling valve device and to close same in said application position.

15. In a fluid pressure brake, in combination, a brake pipe, brake cylinder means, two release communications for releasing fluid under pressure from said brake cylinder means, a brake controlling valve device controlling one of said release communications and movable upon a reduction in pressure in said brake pipe to an application position to close same and to supply fluid under pressure to said brake cylinder means for effecting an application of brakes, said brake controlling valve device being movable from said application position upon an increase in brake pipe pressure to a brake release position for opening said one release communication for releasing fluid under pressure from said brake cylinder means, valve means controlling the other release communication and adapted to be controlled by said brake controlling valve device to open said other release communication in the release position of said brake controlling valve device and to close same in said application position, means selectively operative to render said valve means either controllable by said brake controlling valve device or non-controllable by said brake controlling valve device, and means for conditioning said valve means to maintain the release communication controlled thereby closed when said valve means is rendered non-controllable by said brake controlling valve device.

16. In a fluid pressure brake, in combination, a brake pipe, brake cylinder means, a source of fluid under pressure, a brake controlling valve device movable to an application position upon a reduction in brake pipe pressure to supply fluid under pressure from said source through a communication to said brake cylinder means for effecting an application of brakes and movable from said application position to a release position upon an increase in brake pipe pressure for releasing fluid under pressure from said brake cylinder means through said communication to the atmosphere for effecting a release of the brakes, delay valve means controlling flow of fluid under pressure through said communication to said brake cylinder means and operative to retard same, an application control device having a position for opening a by-pass around said delay valve means to provide for an increased rate of flow of fluid under pressure to said brake cylinder means and movable to another position for closing said by-pass, a release valve device having a position for venting fluid under pressure from said communication and thereby said brake cylinder means independently of the venting of fluid under pressure through said communication by said brake controlling valve device, said release valve device being movable to another position for closing the release communication controlled thereby, said application control device in the position opening said by-pass rendering said release valve device operative in accordance with the operation of said brake controlling valve means to close the release communication controlled thereby in the said application position of said brake controlling valve means and to open such release communication in the release position of said brake controlling valve means, said application control device in the position closing said by-pass effecting operation of said release valve device to close the communication controlled thereby, and means for selectively moving said application control device to its different position.

17. In a fluid pressure brake, in combination, a brake pipe, brake cylinder means, a source of fluid under pressure, a brake controlling valve device movable to an application position upon a reduction in brake pipe pressure to supply fluid under pressure from said source through a communication to said brake cylinder means for effecting an application of brakes and movable from said application position to a release position upon an increase in brake pipe pressure for releasing fluid under pressure from said brake cylinder means through said communication to atmosphere for effecting a release of the brakes, delay valve means controlling flow of fluid under pressure through said communication to said brake cylinder means and operative to retard same, an application control device having a position for opening a by-pass around said delay valve means to provide for an increased rate of flow of fluid under pressure to said brake cylinder means and movable to another position for closing said by-pass, a release valve device having a position for venting fluid under pressure from said communication and thereby said brake cylinder means independently of the venting of fluid under pressure through said communication by said brake controlling valve device, said release valve device being movable to another position for closing the release communication controlled thereby, said application control device in the position opening said by-pass rendering said release valve device operative in accordance with the operation of said brake controlling valve means to close the release communication controlled thereby in the said application position of said brake controlling valve means and to open such release communication in the release position of said brake controlling valve means, said application control device in the position closing said by-pass effecting operation of said release valve device to close the communication controlled thereby, a signal pipe, and means subject to the pressure of fluid in said signal pipe and operative when such pressure is in excess of a certain degree to position said application control device to open said by-pass and when less than said certain degree to actuate said application control device to the position for closing said by-pass.

18. In a fluid pressure brake in combination, a brake pipe, brake cylinder means, a passage through which fluid under pressure is adapted to be supplied to and released from said brake cylinder means, delay means for retarding the flow of fluid under pressure through said passage to said brake cylinder means, said brake controlling means being operative upon both a service and an emergency reduction in brake pipe pressure for supplying fluid under pressure to said passage for flow to said brake cylinder means and being operative upon an increase in brake pipe pressure to release fluid under pressure from said brake cylinder means, means controlled by said brake controlling means and conditioned thereby upon a service reduction in brake pipe pressure to render said delay means ineffective and upon an emergency reduction in brake pipe pressure effective, a by-pass around said delay means through which fluid under pressure is also adapted to flow from said brake controlling means to said brake cylinder means, a control valve controlling said by-pass and having one position for opening said by-pass and another position for closing said by-pass, quick release means operative to release fluid under pressure through said passage from said brake cylinder means independently of the release of fluid under pressure by said brake controlling means, said control valve in the position opening said by-pass providing for operation of said quick release means in accordance with the operation of said brake controlling means to close off the release of fluid under pressure from said brake cylinder means upon a reduction in brake pipe pressure and to provide for such release upon operation of said brake controlling means to open the release communication controlled thereby, said control means in the position closing said by-pass effecting operation of said quick release means to close the brake cylinder release communication controlled thereby, means for positioning said control valve, a safety valve for limiting the pressure of fluid obtained in said brake cylinder means, and valve means connecting said safety valve device to said brake cylinder device and operative only upon an emergency reduction in brake pipe pressure to close communication between said safety valve and brake cylinder means.

19. In a fluid pressure brake, in combination, a brake pipe, an auxiliary reservoir, a brake controlling valve device movable upon a reduction in brake pipe pressure to an application position for supplying fluid under pressure from said auxiliary reservoir to effect an application of brakes and movable upon an increase in brake pipe pressure from said application position to a release position for releasing fluid under pressure to effect a release of brakes and for also opening a restricted charging communication between said brake pipe and said auxiliary reservoir through which fluid under pressure is adapted to be supplied to said auxiliary reservoir for recharging same, valve means controlling a second restricted charging communication between said brake pipe and auxiliary reservoir and adapted to be conditioned by said brake controlling valve device in the release position thereof to open said second charging communication and in the application position to close said second charging communication.

20. In a fluid pressure brake, in combination, a brake pipe, an auxiliary reservoir, a brake controlling valve device movable upon a reduction in brake pipe pressure to an application position for supplying fluid under pressure from said auxiliary reservoir to effect an application of brakes and movable upon an increase in brake pipe pressure from said application position to a release position for releasing fluid under pressure to effect a release of brakes and for also opening a restricted charging communication between said brake pipe and said auxiliary reservoir through which fluid under pressure is adapted to be supplied to said auxiliary reservoir for recharging same, valve means controlling a second restricted charging communication between said brake pipe and auxiliary reservoir and adapted to be conditioned by said brake controlling valve device in the release position thereof to open said second charging communication and in the application position to close said second charging communication, a signal pipe, and means controlled by the pressure of fluid in said signal pipe and operative when such pressure is above a certain degree to render said valve means conditionable by said brake controlling valve means and when less than said certain degree to render said valve means non-conditionable by said brake controlling valve means and to maintain said valve means in the position closing said second reservoir charging communication.

21. In a fluid pressure brake, in combination, a brake pipe, a reservoir, a brake controlling valve device movable upon a reduction in brake pipe pressure to an application position for supplying fluid under pressure from said reservoir to effect an application of brakes and movable upon an increase in brake pipe pressure from said application position to a release position for releasing said fluid under pressure to effect a release of brakes, said brake controlling valve device comprising a piston, a feed groove controlled by said piston for establishing communication between said brake pipe and reservoir in the release position of said valve device for supplying fluid under pressure to said reservoir, said piston closing said feed groove in the application position of said valve device, a valve controlling a second communication between said brake pipe and reservoir which communication is independent of said piston, said valve having one position for opening said second communication for supplying fluid under pressure from said brake pipe to said reservoir and another position for closing said second communication, and means for positioning said valve controlled by said valve device and operative in the release position thereof to effect movement of said valve to the position for opening said second communication and in the application position to effect movement of said valve to the position for closing said second communication.

22. In a fluid pressure brake, in combination, a brake pipe, a reservoir, a brake controlling valve device movable upon a reduction in brake pipe pressure to an application position for supplying fluid under pressure from said reservoir to effect an application of brakes and movable upon an increase in brake pipe pressure from said application position to a release position for releasing said fluid under pressure to effect a release of brakes, said brake controlling valve device comprising a piston, a feed groove controlled by said piston for establishing communication between said brake pipe and reservoir in the release position of said valve device for supplying fluid under pressure to said reservoir, said piston closing said feed groove in the application position of said valve device, a valve controlling a second communication between said brake pipe and reservoir which communication is independent of said piston, said valve having one position for opening said second communication for supplying fluid under pressure from said brake pipe to said reservoir and another position for closing said second communication, and means for positioning said valve controlled by said valve device and operative in the release position thereof to effect movement of said valve to the position for opening said second communication and in the application position to effect movement of said valve to the position for closing said second communication, and a check valve arranged in said second communication for preventing back flow of fluid under pressure from said reservoir to said brake pipe.

23. In a fluid pressure brake, in combination, a brake pipe, an auxiliary reservoir, an emergency reservoir, valve means movable upon a reduction in brake pipe pressure to an application position for supplying fluid under pressure from said reservoirs to effect an application of brakes and movable to a release position upon an increase in brake pipe pressure for releasing said fluid under pressure to effect a release of brakes, said valve means including a piston having an application position and a release position and a restricted charging communication for said reservoir controlled by said piston, said piston in its release position opening said communication for supplying fluid under pressure from said brake pipe to said reservoirs and in its application position closing said communication, a valve device operative to establish a communication between said brake pipe and said reservoirs which is independent of the communication controlled by said piston to provide for additional flow of fluid under pressure from the brake pipe to said reservoirs, check valve means arranged in the communication controlled by said valve device operative to prevent back flow of fluid under pressure from said reservoirs to said brake pipe and to prevent flow of fluid under pressure from one of said reservoirs to the other, said valve device having one position for opening the communication controlled thereby and another position for closing same, said valve means being adapted to control said valve device and being operative in its application position to actuate said valve device to close the communications controlled thereby and in its release position to operate said valve device to its communication opening position.

24. In a fluid pressure brake, in combination, a brake pipe, an auxiliary reservoir, an emergency reservoir, valve means movable upon a reduction in brake pipe pressure to an application position for supplying fluid under pressure from said reservoirs to effect an application of brakes and movable to a release position upon an increase in brake pipe pressure for releasing said fluid under pressure to effect a release of brakes, said valve means including a piston having an application position and a release position and a restricted charging communication for said reservoir controlled by said piston, said piston in its release position opening said communication for supplying fluid under pressure from said brake pipe to said reservoirs and in its application position closing said communication, a valve device operative to establish a communication between said brake pipe and said reservoirs which is independent of the communication controlled by said piston to provide for additional flow of fluid under pressure from the brake pipe to said reservoirs, check valve means arranged in the communication controlled by said valve device operative to prevent back flow of fluid under pressure from said reservoirs to said brake pipe and to prevent flow of fluid under pressure from one of said reservoirs to the other, said valve device having one position for opening the communication controlled thereby and another position for closing same, said valve means being adapted to control said valve device and being operative in its application position to actuate said valve device to close the communications controlled thereby and in its release position to operate said valve device to its communication opening position, means for rendering said valve device non-controllable by said valve means, and means operative upon said valve device being rendered non-controllable by said valve means to move said valve device to the position closing the communications controlled thereby.

25. In a fluid pressure brake, in combination, a brake pipe, an auxiliary reservoir, brake cylinder means, a brake controlling valve device, operative upon a reduction in brake pipe pressure to supply fluid under pressure from said auxiliary reservoir to said brake cylinder means for effecting an application of the brakes and movable from said application position to a release position upon an increase in brake pipe pressure for releasing fluid under pressure from said brake cylinder means to effect a release of brakes and for establishing a restricted communication between said brake pipe and auxiliary reservoir for the flow of fluid under pressure from said brake pipe to said reservoir for recharging same, a control valve for controlling a second recharging communication between said brake pipe and auxiliary reservoir and a second release communication from said brake cylinder means and having one position for opening both of said second communications and another position for closing same, control means controlling said control valve and adapted to be controlled by said brake controlling valve device and operative upon movement of said brake controlling valve device to said application position to actuate said control valve to the position for closing both of said second communications and operative upon movement of said brake controlling valve device to its release position to actuate said control valve to open both of said second communications, and means conditionable for rendering said control means either responsive or non-responsive to operation of said brake controlling valve device and when non-responsive to effect operation of said control means to maintain said control valve in the position closing the said second communications.

26. In a fluid pressure brake, in combination, a brake pipe, an auxiliary reservoir, brake cylinder means, a brake controlling valve device operative upon a reduction in brake pipe pressure to supply fluid under pressure from said auxiliary reservoir to said brake cylinder means for effecting an application of the brakes and movable from said application position to a release position upon an increase in brake pipe pressure for releasing fluid under pressure from said brake cylinder means to effect a release of brakes and for establishing a restricted communication between said brake pipe and auxiliary reservoir for the flow of fluid under pressure from said brake pipe to said reservoir for recharging same, a control valve for controlling a second recharging communication between said brake pipe and auxiliary reservoir and a second release communication from said brake cylinder means and having one position for opening both of said second communications and another position for closing same, control means controlling said control valve and adapted to be controlled by said brake controlling valve device and operative upon movement of said brake controlling valve device to said application position to actuate said control valve to the position for closing both of said second communications and operative upon movement of said brake controlling valve device to its release position to actuate said control valve to open both of said second communications, a valve having one position for rendering said control means responsive to operation of said brake controlling valve device and another position for effecting operation of said control means to hold said control valve in its communication closing position, a signal pipe, and means controlled by the pressure of fluid in said signal pipe controlling the last named valve and operative when such pressure exceeds a certain degree to effect movement of the valve to its first named position and when less than said certain degree to its second named position.

27. In a fluid pressure brake, in combination, a brake pipe, a quick action chamber, an emergency valve device controlled by the opposing pressures of said pipe and chamber and operative upon an emergency rate of reduction of brake pipe pressure to effect an emergency application of brakes and to establish a communication for releasing fluid under pressure from said chamber, means for restricting the release of fluid under pressure from said chamber to provide for a certain rate of reduction in pressure in said chamber, other valve means operative upon an emergency reduction in brake pipe pressure to also release fluid under pressure from said chamber, a choke for restricting the release of fluid under pressure from said chamber by said other valve means to provide for a faster rate of reduction in pressure in said chamber than provided by said restricting means, and means for selectively rendering said other valve means either effective or ineffective.

28. In a fluid pressure brake, in combination, a brake pipe, a quick action chamber, an emergency valve device controlled by the opposing pressures of said pipe and chamber and operative upon an emergency rate of reduction of brake pipe pressure to effect an emergency application of brakes and to establish a communication for releasing fluid under pressure from said chamber, means for restricting the release of fluid under pressure from said chamber to provide for a certain rate of reduction in pressure in said chamber, other valve means operative upon an emergency reduction in brake pipe pressure for opening another venting communication from said quick action chamber for providing a faster rate of reduction in pressure in said quick action chamber, a valve controlling communication through which fluid under pressure is vented from said quick action chamber by said other valve means and having one position for closing such communication and another position for opening same, a signal pipe, and means subject to the pressure of fluid in said signal pipe controlling the position of said valve and operative to actuate said valve to its communication opening position when the pressure in said signal pipe is of a certain degree and to the communication closing position when of a less degree.

29. In a fluid pressure brake in combination, a brake pipe, brake cylinder means, a service application valve device operative upon either a service or an emergency rate of reduction in brake pipe pressure to supply fluid under pressure to said brake cylinder means for effecting an application of brakes, a quick action chamber, an emergency valve device controlled by the opposing pressures of said brake pipe and quick action chamber and operative upon a service reduction in brake pipe pressure to effect a service rate of reduction in pressure in said quick action chamber and upon an emergency reduction in brake pipe pressure to supply fluid under pressure to said brake cylinder means and to also effect venting of fluid under pressure from said quick action chamber at a chosen rate, a safety valve, a valve device controlled by the opposing pressures of said brake pipe and an actuating chamber and having a normal position connecting said safety valve device to said brake cylinder means and operative from said normal position only upon an emergency reduction in brake pipe pressure to disconnect said safety valve from said brake cylinder means and to open a second vent from said quick action chamber to increase the rate of reduction in pressure therein, a valve controlling communication between said quick action chamber and said valve device and having one position for opening such communication and another position for closing same, and means for selectively positioning said valve.

30. In a fluid pressure brake in combination, a brake pipe, brake cylinder means, a service application valve device operative upon either a service or an emergency rate of reduction in brake pipe pressure to supply fluid under pressure to said brake cylinder means for effecting an application of brakes, a quick action chamber, an emergency valve device controlled by the opposing pressures of said brake pipe and quick action chamber and operative upon a service reduction in brake pipe pressure to effect a service rate of reduction in pressure in said quick action chamber and upon an emergency reduction in brake pipe pressure to supply fluid under pressure to said brake cylinder means and to also effect venting of fluid under pressure from said quick action chamber at a chosen rate, a safety valve, a valve device controlled by the opposing pressures of said brake pipe and an actuating chamber and having a normal position connecting said safety valve device to said brake cylinder means and operative from said normal position only upon an emergency reduction in brake pipe pressure to disconnect said safety valve from said brake cylinder means and to open a second vent from said quick action chamber to increase the rate of reduction in pressure therein, a valve controlling communication between said quick action chamber and said valve device and having one position for opening such communication and another position for closing same, means for selectively positioning said valve, a delay valve for retarding the flow of fluid under pressure from said service and emergency application valve devices to said brake cylinder means, said delay valve being controlled by said emergency application valve device and being rendered effective thereby upon an emergency reduction in brake pipe pressure and ineffective at other times, said valve controlling a fluid pressure supply communication to said brake cylinder means which by-passes said delay valve and being operative to open said communication upon connecting said quick action chamber to said valve device and to close such communication in the other position of said valve.

31. In a fluid pressure brake, in combination, a brake pipe, a signal pipe, a source of fluid under pressure, valve means operative upon a reduction in brake pipe pressure to supply fluid under pressure from said source through a communication to effect an application of brakes, delay means operative to retard the flow of fluid under pressure through said communication, a valve controlling a by-pass around said delay means and operative to either close said by-pass to provide for the flow of said fluid under pressure being controlled by said delay means or to open said by-pass to provide for a faster flow of fluid under pressure, a spring, movable abutment means connected to said valve and subject to the pressure of fluid in said signal pipe and the opposing pressures of fluid and of said spring, and operable by fluid under pressure supplied to said signal pipe to operate said valve to open said by-pass and operable by said opposing pressures upon release of fluid under pressure from said signal pipe to effect operation of said valve to close said by-pass.

32. In a fluid pressure brake, in combination, a brake pipe, a signal pipe, a source of fluid under pressure, valve means operative upon a reduction in brake pipe pressure to supply fluid under pressure from said source through a communication to effect an application of brakes, delay means operative to retard the flow of fluid under pressure through said communication, a valve controlling a by-pass around said delay means and operative to either close said by-pass to provide for the flow of said fluid under pressure being controlled by said delay means or to open said by-pass to provide for a faster flow of fluid under pressure, a pair of differential area movable abutments connected to each other and to said valve, the larger abutment being subject to pressure of fluid in said signal pipe and operative upon charging said signal pipe to move said valve to the position opening said by-pass, a spring, the smaller abutment being subject to pressure of fluid and said spring acting in opposition to signal pipe pressure on said larger abutment and being operative thereby upon venting of fluid from said signal pipe to effect operation of said valve to close said by-pass.

33. In a fluid pressure brake, in combination, a brake pipe, a brake cylinder, a brake controlling valve device comprising application means responsive to both a service and an emergency reduction in pressure in said brake pipe to supply fluid under pressure to said brake cylinder device to effect respectively either a service or an emergency application of brakes, a safety valve device for limiting the pressure of fluid in said brake cylinder device, valve means separate from said application means controlling communication between said safety valve device and brake cylinder device, said valve means being subject to brake pipe pressure and an opposing pressure and operable by said opposing pressure upon an emergency reduction in brake pipe pressure to close said communication, brake pipe pressure acting on said valve means being operable at all times except upon an emergency reduction to maintain said valve means in a position opening said communication.

34. In a fluid pressure brake, in combination, a brake pipe, a brake cylinder, an auxiliary reservoir, an emergency reservoir, and a quick action chamber, a service application valve device operative upon both a service and an emergency reduction in brake pipe pressure to supply fluid under pressure from said auxiliary reservoir to said brake cylinder, an emergency application valve device operable upon a service reduction in brake pipe pressure to effect a service reduction in pressure in said quick action chamber and upon an emergency reduction in brake pipe pressure to supply fluid under pressure from said emergency reservoir to said brake cylinder, a safety valve device for limiting the pressure of fluid in said brake cylinder, and valve means separate from said application valve devices controlling communication between said safety valve device and brake cylinder, said valve means being controlled by brake pipe pressure and an opposing pressure and being operable by said opposing pressure upon an emergency reduction in brake pipe pressure to close said communication, brake pipe pressure being operable to maintain said valve means in the position opening said communication at all times except upon an emergency reduction in brake pipe pressure.

35. In a fluid pressure brake, in combination, a brake pipe, a brake cylinder, a brake controlling valve device comprising a pipe bracket, a service application valve device mounted on one face of said bracket and operative upon both a service and an emergency reduction in brake pipe pressure to supply fluid under pressure to a passage in said bracket for supply to said brake cylinder, an emergency valve device mounted on another face of said bracket and operative upon an emergency reduction in brake pipe pressure to supply fluid under pressure to said passage for supply to said brake cylinder, a safety valve device, and valve means carrying said safety valve device and mounted on a third face of said bracket, said valve means controlling a communication between said safety valve device and passage and being controlled by brake pipe pressure and an opposing pressure and operative by said opposing pressure upon an emergency reduction in brake pipe pressure to close said communication, the pressure of fluid in said brake pipe being operative at all times except upon an emergency reduction to operate said valve means to open said communication.

36. A fluid pressure brake equipment for use in two different classes of service comprising in combination, a brake pipe adapted to be charged with a certain degree of pressure for one class of service and a lower degree of pressure for the other class of service, and a signal pipe adapted to be charged with fluid under pressure in said one class of service and to be void of fluid under pressure in said other class of service, a brake cylinder device, brake controlling means having two brake application communications and operable upon both a service and an emergency reduction in brake pipe pressure to supply fluid under pressure for flow through said communications to said brake cylinder device, means arranged to retard flow of fluid under pressure through one of said communications to said brake cylinder device, a valve controlling the other of said two communications having an open position for opening the communication and a closed position for closing the communication, means controlled by pressure in said signal pipe connected with said valve for controlling same and operable upon charging said signal pipe with fluid under pressure to move said valve to its open position, means for moving said valve to its closed position when said signal pipe is void of fluid under pressure, a safety valve device adjusted to limit to a desired degree the pressure obtained in said brake cylinder device upon a full service reduction in brake pipe pressure from said higher degree of brake pipe pressure, said degree of pressure being in excess of that obtained in said brake cylinder device upon a full service reduction in brake pipe pressure from said lower degree of brake pipe pressure, valve means controlling communication between said safety valve device and brake cylinder device, and means controlling said valve means controlled by brake pipe pressure and an opposing pressure and operative upon an emergency reduction in brake pipe pressure to close the communication between said safety valve device and brake cylinder device, said brake pipe pressure being operative at all times to actuate said valve means to open communication between said safety valve device and brake cylinder device.

GLENN T. McCLURE.